US007171513B2

(12) United States Patent
Gonzalez et al.

(10) Patent No.: US 7,171,513 B2
(45) Date of Patent: *Jan. 30, 2007

(54) TECHNIQUES FOR OPERATING NON-VOLATILE MEMORY SYSTEMS WITH DATA SECTORS HAVING DIFFERENT SIZES THAN THE SIZES OF THE PAGES AND/OR BLOCKS OF THE MEMORY

(75) Inventors: Carlos Gonzalez, Los Gatos, CA (US); Kevin M. Conley, San Jose, CA (US); Eliyahou Harari, Los Gatos, CA (US)

(73) Assignee: SanDisk Corporation, Milpitas, CA (US)

(*) Notice: Subject to any disclaimer, the term of this patent is extended or adjusted under 35 U.S.C. 154(b) by 170 days.

This patent is subject to a terminal disclaimer.

(21) Appl. No.: 10/727,759

(22) Filed: Dec. 3, 2003

(65) Prior Publication Data
US 2004/0111555 A1    Jun. 10, 2004

Related U.S. Application Data

(63) Continuation of application No. 09/718,802, filed on Nov. 22, 2000, now Pat. No. 6,684,289.

(51) Int. Cl.
*G06F 12/02* (2006.01)
(52) U.S. Cl. .................. 711/103; 711/171; 711/172
(58) Field of Classification Search ............... None
See application file for complete search history.

(56) References Cited
U.S. PATENT DOCUMENTS 5,172,338 A    12/1992    Mehrotra et al.
5,200,959 A    4/1993    Gross et al.
5,270,979 A    12/1993    Harari et al.
5,315,541 A    5/1994    Harari et al.
5,428,621 A    6/1995    Mehrotra et al.
5,430,859 A    7/1995    Norman et al.
5,532,962 A    7/1996    Auclair et al.
5,559,956 A    9/1996    Sukegawa (Continued)

FOREIGN PATENT DOCUMENTS

JP    6161675    6/1994

(Continued)

OTHER PUBLICATIONS

EPO/ISA, "Written Opinion", mailed in related PCT/US01/47166 on Jun. 13, 2003, 5 pages.

(Continued)

*Primary Examiner*—Gary Portka
(74) *Attorney, Agent, or Firm*—Parsons Hsue & de Runtz LLP (57) ABSTRACT

A non-volatile memory system, such as a flash EEPROM system, is disclosed to be divided into a plurality of blocks and each of the blocks into one or more pages, with sectors of data being stored therein that are of a different size than either the pages or blocks. One specific technique packs more sectors into a block than pages provided for that block. Error correction codes and other attribute data for a number of user data sectors are preferably stored together in different pages and blocks than the user data.

5 Claims, 5 Drawing Sheets

U.S. PATENT DOCUMENTS

| | | |
|---|---|---|
| 5,602,987 A | 2/1997 | Harari et al. |
| 5,603,001 A | 2/1997 | Sukegawa et al. .......... 711/103 |
| 5,663,901 A | 9/1997 | Wallace et al. |
| 5,673,383 A | 9/1997 | Sukegawa |
| 5,677,872 A | 10/1997 | Samachisa et al. |
| 5,712,179 A | 1/1998 | Yuan |
| 5,712,180 A | 1/1998 | Guterman et al. |
| 5,822,781 A | 10/1998 | Wells et al. ................. 711/171 |
| 5,890,192 A | 3/1999 | Lee et al. |
| 5,930,167 A | 7/1999 | Lee et al. |
| 5,946,714 A | 8/1999 | Miyauchi .................... 711/205 |
| 5,987,478 A | 11/1999 | See et al. ................... 707/205 |
| 6,134,640 A | 10/2000 | Unno et al. ................. 711/171 |
| 6,151,248 A | 11/2000 | Harari et al. |
| 6,222,762 B1 | 4/2001 | Guterman et al. |
| 6,282,624 B1 | 8/2001 | Kimura et al. |
| 6,356,486 B1 | 3/2002 | Banks ................... 365/189.01 |
| 6,378,033 B1 | 4/2002 | Nishikawa ................. 711/103 |
| 6,426,893 B1 | 7/2002 | Conley et al. |
| 6,434,658 B1 | 8/2002 | Fukuzumi .................. 711/103 |
| 6,463,516 B1 | 10/2002 | Leong et al. ............... 711/170 |
| 6,684,289 B1 | 1/2004 | Gonzalez et al. |
| 6,697,928 B2 | 2/2004 | March et al. ............... 711/171 |
| 7,032,065 B2 | 4/2006 | Gonzalez et al. |

FOREIGN PATENT DOCUMENTS

| | | |
|---|---|---|
| JP | 07-302175 | 11/1995 |
| JP | 7302176 | 11/1995 |
| JP | 11065921 | 3/1999 |
| JP | 2000-293427 | 10/2000 |
| WO | WO 99/27539 | 6/1999 |
| WO | WO 00/49488 | 8/2000 |
| WO | WO 01/61703 | 8/2001 |

OTHER PUBLICATIONS

Japanese Patent Office, "Notification of Reasons for Refusal", mailed in Japanese application No. 2002-550258 drafted on Aug. 30, 2005, 11 pages.

"International Search Report", from corresponding PCT application No. PCT/US01/47166, mailed Apr. 10, 2003, 5 pages.

"Notification of Transmittal of the International Preliminary Examination Report", European Patent Office, corresponding PCT application No. PCT/US01/47166, mailing date Aug. 12, 2003, 6 pages.

S32 — A Block Storing More User Data Sectors than Physical Pages in the Block

*FIG._9*

A Block Storing Attribute Data for One User Data Block in an Individual Page

TECHNIQUES FOR OPERATING NON-VOLATILE MEMORY SYSTEMS WITH DATA SECTORS HAVING DIFFERENT SIZES THAN THE SIZES OF THE PAGES AND/OR BLOCKS OF THE MEMORY

CROSS-REFERENCE TO RELATED APPLICATION

This application is a continuation of application Ser. No. 09/718,802, filed Nov. 22, 2000 now U.S. Pat. No. 6,684,289, which application is incorporated herein in its entirety by this reference.

BACKGROUND OF THE INVENTION

This invention relates to semiconductor memory systems, particularly to non-volatile memory systems, and has application to flash electrically-erasable and programmable read-only memories (EEPROMs).

Flash EEPROM systems are being applied to a number of applications, particularly when packaged in an enclosed card that is removably connected with a host system. Current commercial memory card formats include that of the Personal Computer Memory Card International Association (PCMCIA), CompactFlash (CF), MultiMediaCard (MMC) and Secure Digital (SD). One supplier of these cards is SanDisk Corporation, assignee of this application. Host systems with which such cards are used include personal computers, notebook computers, hand held computing devices, cameras, audio reproducing devices, and the like. Flash EEPROM systems are also utilized as bulk mass storage embedded in host systems.

Such non-volatile memory systems include an array of floating-gate memory cells and a system controller. The controller manages communication with the host system and operation of the memory cell array to store and retrieve user data. The memory cells are grouped together into blocks of cells, a block of cells being the smallest grouping of cells that are simultaneously erasable. Prior to writing data into one or more blocks of cells, those blocks of cells are erased. User data are typically transferred between the host and memory array in sectors. A sector of user data can be any amount that is convenient to handle, preferably less than the capacity of the memory block, often being equal to the standard disk drive sector size, 512 bytes. In one commercial architecture, the memory system block is sized to store one sector of user data plus overhead data, the overhead data including information such as an error correction code (ECC) for the user data stored in the block, a history of use of the block, defects and other physical information of the memory cell block. Various implementations of this type of non-volatile memory system are described in the following United States patents and pending applications assigned to SanDisk Corporation, each of which is incorporated herein in its entirety by this reference: U.S. Pat. Nos. 5,172,338, 5,602,987, 5,315,541, 5,200,959, 5,270,979, 5,428,621, 5,663,901, 5,532,962, 5,430,859 and 5,712,180, and application Ser. Nos. 08/910,947, filed Aug. 7, 1997, now Pat. No. 6,222,762, and Ser. No. 09/343,328, filed Jun. 30, 1999, now Pat. No. 6,151,248.

Another type of non-volatile memory system utilizes a larger size memory cell block that each stores multiple pages per block, a page being a minimum unit of data that is programmed as part of a single programming operation. One sector of user data, along with overhead data related to the user data and the block in which such data is being stored, are typically included in a page. Yet another specific system that has been commercially available from SanDisk Corporation for more than one year from the filing date hereof, stores overhead data related to the user data being stored, such as ECC, along with the user data in a common sector, while overhead data related to the block in which the sector is stored is written as part of a different sector in a different block. An example of this system is given in patent application Ser. No. 09/505,555, filed Feb. 17, 2000, now Pat. No. 6,426,893, which patent is incorporated herein in its entirety by this reference.

One architecture of the memory cell array conveniently forms a block from one or two rows of memory cells that are within a sub-array or other unit of cells and which share a common erase gate. U.S. Pat. Nos. 5,677,872 and 5,712,179 of SanDisk Corporation, which are incorporated herein in their entirety, give examples of this architecture. Although it is currently most common to store one bit of data in each floating gate cell by defining only two programmed threshold levels, the trend is to store more than one bit of data in each cell by establishing more than two floating-gate transistor threshold ranges. A memory system that stores two bits of data per floating gate (four threshold level ranges or states) is currently available, with three bits per cell (eight threshold level ranges or states) and four bits per cell (sixteen threshold level ranges) being contemplated for future systems. Of course, the number of memory cells required to store a sector of data goes down as the number of bits stored in each cell goes up. This trend, combined with a scaling of the array resulting from improvements in cell structure and general semiconductor processing, makes it practical to form a memory cell block in a segmented portion of a row of cells. The block structure can also be formed to enable selection of operation of each of the memory cells in two states (one data bit per cell) or in some multiple such as four states (two data bits per cell), as described in SanDisk Corporation U.S. Pat. No. 5,930,167, which is incorporated herein in its entirety by this reference.

Since the programming of data into floating-gate memory cells can take significant amounts of time, a large number of memory cells in a row are typically programmed at the same time. But increases in this parallelism cause increased power requirements and potential disturbances of charges of adjacent cells or interaction between them. U.S. Pat. No. 5,890,192 of SanDisk Corporation, which is incorporated herein in its entirety, describes a system that minimizes these effects by simultaneously programming multiple chunks of data into different blocks of cells located in different operational memory cell units (sub-arrays).

The foregoing referenced patents describe a memory array design wherein the individual memory cells are connected between adjacent bit lines in rows that include word lines, a "NOR" architecture. A "NAND" architecture is also commercially popular for non-volatile memory arrays, wherein a string of many memory cells are connected together in series between individual bit lines and a reference potential, rows of cells being formed from one cell of each of many such strings. Other specific architectures are also suggested in the literature. The foregoing referenced patents also describe the use of a type of non-volatile memory cell utilizing one or two floating gates made of a conductive material on which a level of electron charge is stored to control the effective threshold level of the cell. Alternative technologies for storing electrons, useful in various memory array architectures, includes those that trap electrons in a dielectric layer between two dielectric layers, rather than using conductive floating gates. Additionally, the foregoing referenced patents further describe the use of erase gates to which charge is removed from the cells' storage elements during an erasure of one or more blocks at a time. An alternative technique erases electrons from the storage element to the substrate as an erase electrode.

SUMMARY OF THE INVENTION

According to one aspect of the present invention, briefly and generally, rather than constraining one or some integer number of sectors of user data and accompanying overhead data to fill the individual data pages, at least some such sectors of data are split between two or more pages of memory. In one configuration, one or more sectors of user data, along with all the accompanying overhead data, a portion of the overhead data or none of the overhead data, are programmed together in one page of the memory while other sectors similarly constituted are divided and programmed into two or more pages in a manner that effectively utilizes the storage capacity of the pages. In a another configuration, the individual sectors of user data, with or without at least some part of its overhead data, are larger than the capacity of the pages in which they are stored, resulting in virtually every such sector being split between two pages. These approaches open up many possibilities for efficient use of a particular memory block and page architecture with an improved performance that are not possible when the memory system is constrained to store an integer number of data sectors in each page or block. The techniques have applications both in systems where blocks each contain many pages and in systems where the individual blocks contain a single page.

According to another aspect of the present invention, a sector contains primarily only user data while overhead data of both that user data and of the block in which it is written are stored as part of one or more other pages in other block(s) of memory cells. This has an advantage of increasing the amount of user data that may be stored in a block of a given size, having a particular application to the reading or programming of streaming data such as occurs when the content of the data is music, other audio, or video information. This technique also has the advantage that different frequencies of updating the user data and the overhead data may be accommodated without the updating of one necessitating the updating of the other. This improves system performance, particularly by reducing reading and/or programming times. Further, this allows the amount of overhead data that is stored to be independent of the size of the pages and blocks in which user data and overhead data are stored in existing systems.

In a specific example of a system incorporating both of these aspects of the present invention, a memory system having pages designed to store sectors of user data and accompanying overhead data are used differently than for which the system has been designed. A number of user data sectors, without most or all of the overhead data, are packed into a fewer number of memory pages, and the corresponding overhead data for a number of such user data sectors are combined together to form overhead data sectors that are stored in other pages of the memory. This has a particular advantage in long programming operations since the overhead data corresponding to user data sectors being written to the non-volatile memory may be accumulated in a faster buffer memory that is part of the controller, and then written from the buffer to the non-volatile memory all at once. It also increases speed during reading operations, since sectors of overhead data corresponding to user data sectors to be read are first read into the faster buffer memory of the controller. Overhead data that are necessary as part of reading the user data sectors can then be read faster from the buffer that they could from the non-volatile memory directly. This is a particular advantage with the ECCs of the user data sectors, which may be processed directly from the buffer memory as the user data sectors are read.

Additional aspects, features and advantages of the present invention are included in the following description of its exemplary embodiments, which description should be taken in conjunction with the accompanying drawings.

DESCRIPTION OF REPRESENTATIVE EMBODIMENTS

Figure 1:
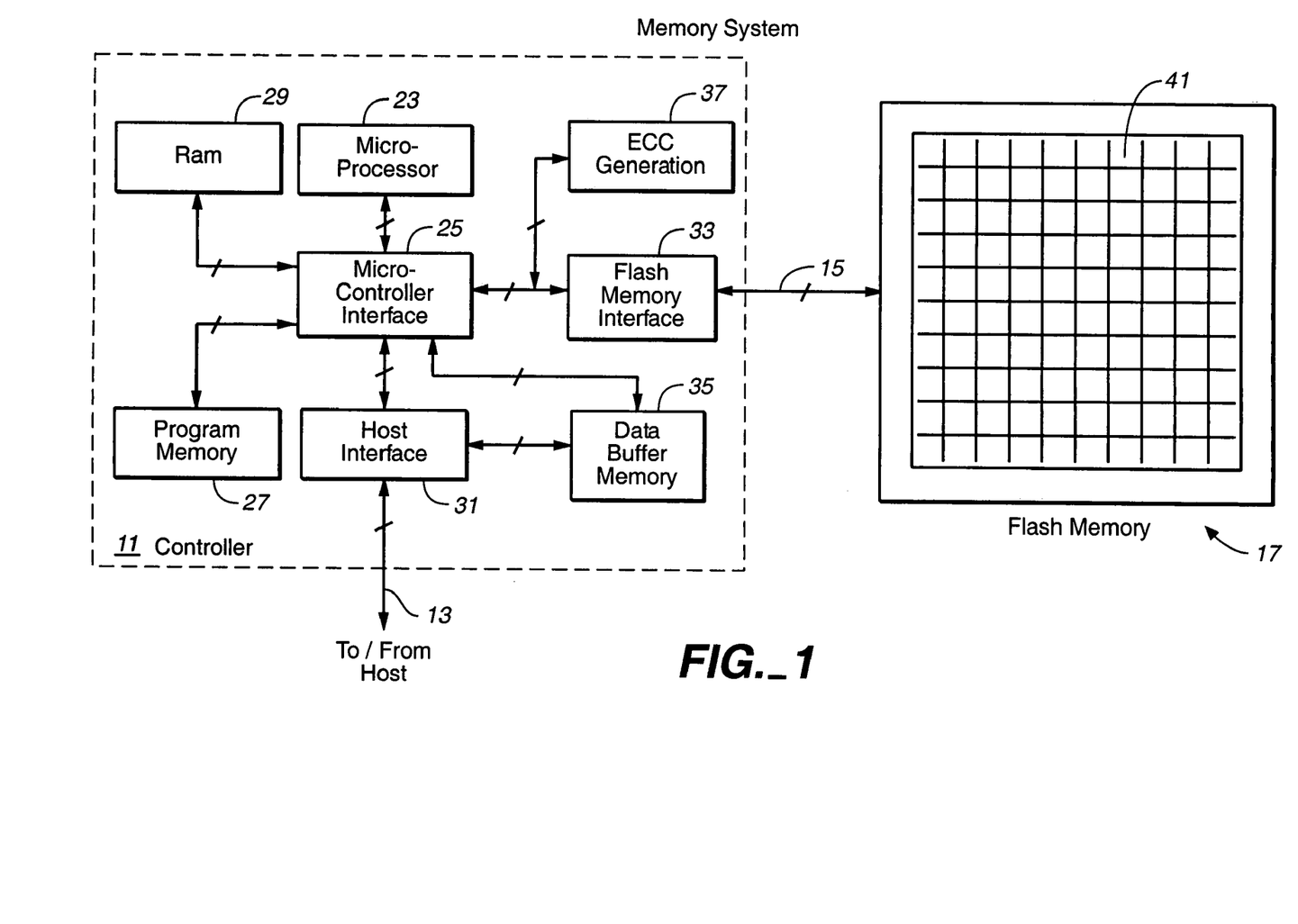
FIG. 1 is a schematic block diagram of a memory system which may be operated in accordance with the present invention.

FIG. 1 provides a diagram of the major components of a non-volatile memory system that are relevant to the present invention. A controller 11 communicates with a host system (not shown) over lines 13. The controller 11, illustrated to occupy one integrated circuit chip, communicates over lines 15 to one or more non-volatile memory cell arrays, one such array 17 being illustrated, each of the arrays usually formed on a separate integrated circuit chip. The illustrated controller is usually contained on a single integrated circuit chip, either without a flash EEPROM array (the example shown) or with some or all of the system's memory cell array. Even if a memory cell array is included on the controller circuit chip, an additional one or more chips that each contain only a memory array and associated circuitry will often be included in the system.

User data is transferred between the controller 11 and the memory array 17, in this example, over the lines 15. The memory array is addressed by the controller 11 also, in this example, over the lines 15. The memory system shown in FIG. 1 can be embedded as part of a host system or packaged into a card, such as a card following one of the card standards previously described, or some other standard. In the case of a card, the lines 13 terminate in external terminals on the card for mating with a complementary socket within a host system. Although use of one controller chip and multiple memory chips is typical, the trend is, of course, to use fewer separate chips for such a system by combining their circuits. An example capacity of one of the illustrated memory chips is 256 Mbits, thus requiring only two such memory chips, plus the controller chip, to form a non-volatile memory system having a data capacity of 64 megabytes. Use of a single smaller capacity memory chip results in a memory system of lesser capacity, an 8 megabyte system being a marketable example. Conversely, use of memory chips with a higher bit storage density and/or use of more memory array chips in a system will result in a higher capacity system. The controller 11 includes a micro-processor or micro-contoller 23 connected through controller interface logic 25 to internal memories and interfaces with external components. A program memory 27 stores the firmware and software accessed by the micro-controller 23 to control the memory system operation to read data from the connected memory array(s) and transmit that data to the host, to write data from the host to the memory chip(s), and to carry out numerous other monitoring and controlling functions. The memory 27 can be a volatile re-programmable random-access-memory (RAM), a non-volatile memory that is not re-programmable (ROM), a one-time programmable memory (OTP) or a re-programmable flash EEPROM system. If the memory 27 is re-programmable, the controller can be configured to allow the host system to program it. A random-access-memory (RAM) 29 (such as a dynamic RAM (DRAM) or static RAM (SRAM)) is used to store, among other data, tables formed from data in the non-volatile memory 17 that are accessed during reading and writing operations. The RAM 29 also includes a number of registers used by the controller processor 23.

A logic circuit 31 interfaces with the host communication lines 13, while another logic circuit 33 interfaces with the memory array(s) through the lines 15. Another memory 35 is used as a buffer to temporarily store user data being transferred between the host system and non-volatile memory. The memories in the controller are usually volatile, since memories with fast access and other characteristics desired for efficient controller access have that characteristic, and may be combined physically into a single memory. A dedicated processing circuit 37 accesses the streaming user data being transferred between the controller and flash interfaces 25 and 33 for generating an ECC, or other type of redundancy code, from the user data. During programming, the generated ECC is stored in the memory array 17, along with the data from which is was calculated. During a reading operation, the ECC generated by the circuit 37 is compared with that read from the memory array 17 along with the data from which the read ECC was calculated during programming.

The flash memory 17 includes an array of memory cells that may be one of the types and according to one of the architectures that are described in the Background, or some other type and/or architecture. Such an array is physically divided into distinct blocks of memory cells that are simultaneously erasable, where a block is the smallest unit of memory cells that is erasable. The blocks individually contain the same number of memory cells, one size storing 528 bytes of data and another storing 4096 bytes of data, as examples. Of course, the number of memory cells required to store a given amount of data depends upon the number of bits of data that are stored in each cell. Multiple blocks of cells are usually addressed at one time for erasure together. The larger sized blocks are typically divided, in turn, into multiple pages of memory cells that are distinct, where a page is the smallest unit of memory cells that is programmable in a single program operation. As many memory cells as practical are programmed at the same time in order to reduce time necessary to program a given amount of data. In some systems, all of the cells in a page are programmed simultaneously, and in other systems, a distinct chunk of cells of a page are programmed one at a time, in a manner to minimize disturbing the charge on other cells, until all chunks have been programmed. In one specific system, there are four chunks in each page. A larger number of cells than in a single programming chunk are usually read in parallel.

Figure 2:
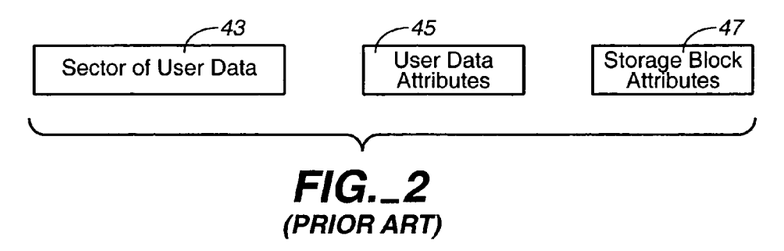
FIG. 2 illustrates typical components of a sector of data that is stored in present non-volatile memories.

With reference to FIG. 2, components of a sector of data usually include a large number of bytes 43 of user data, a few bytes 45 of attributes of the user data and a few byte 47 of attributes of the page and/or block in which the entire sector is being stored. That is, a stream or file of user data is divided into user data sectors 43, and then the attribute data fields 45 and 47 are added to each user data sector to form a complete data sector for storage. A typical amount of user data which is included in the sector 43 is 512 bytes, the same as the amount of user data in a disk storage system sector. The attributes 45 of the user data usually include an ECC that is calculated by the controller from the user data stored in the same sector, both during programming and reading of the sector. The attributes 47 of the physical block (some of which may alternative be stored for each page) in which the sector is stored often include a physical address for the block, a logical address for the block, a number of times that the block has been erased, a programming and/or erase voltage that is to be applied to cells of the block, and any other such characteristics of the block. Another ECC is usually calculated from the attribute data and stored as part of the attributes fields.

The incoming data to a memory system is often transformed in some manner before being stored. For example, in a binary system, incoming data can be inverted prior to its programming in order to avoid repeatedly programming a static pattern in a given block and then changed back after a while, in order to even the wear of the block's memory cells. In a multi-state system, the data is rotated (translated) between its multiple states in some predetermined order. When the data is transformed, a flag indicating the transformation that has been applied is stored as part of either the data attributes 45, if the transform is made on a page basis, or as part of the block attributes 47, if the transform is made on a block basis. When such data is read from the memory, the stored transform flag then allows the controller to apply an inverse of the transform in order to translate the read data back to its form initially received before transmitting the data to the host. Another example of a transform that may be made is encryption of the user data, wherein the transform flag can then include an encryption key for use during decryption.

Figure 3:
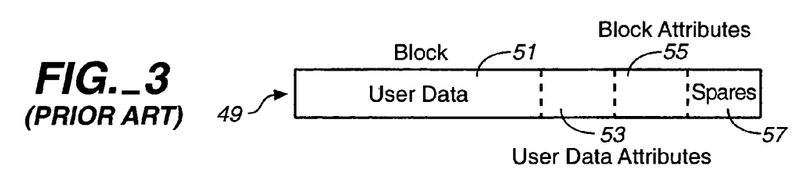
FIG. 3 illustrates one existing way of storing the data of FIG. 2.

FIG. 3 shows generally the data content of a block of memory cells that has been used for many years in the products of SanDisk Corporation, as an specific example of what has been done before. Each individual block 49 includes enough memory cells to store one sector's worth of data, namely 528 bytes. User data 51 is 512 bytes. In addition to the user data and block attributes 53 and 55, the remaining 16 bytes of storage space in the block 49 includes spare cells. Spare cells are provided in those systems that replace defective cells within a block. When this is done, addresses of defective cells are also part of the block attribute data 55.

Figure 4:
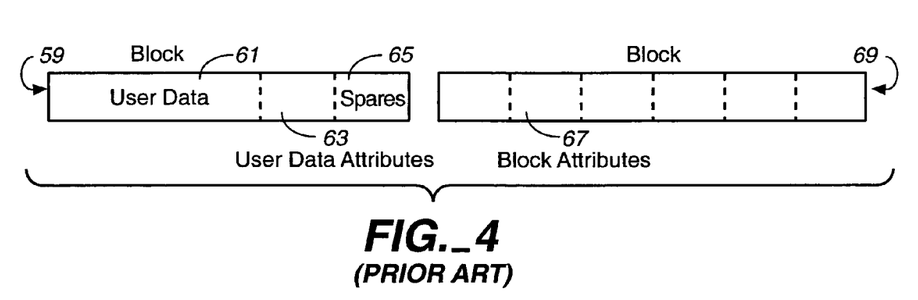
FIG. 4 illustrates another existing way of storing the data of FIG. 2.

A more recent variation used in a SanDisk product is illustrated in FIG. 4. A primary difference with the data storage format of FIG. 3 is that the block attributes are not stored in the same block as the user data. In a block 59, for example, 512 bytes of user data 61 are stored, and 8 bytes of ECC and flags are stored as user data attributes 63. This leaves a number of spare memory cells 65 in the block 59 that is sufficient to store 8 bytes of user and/or attribute data, to replace any defective cells within the block 59 in which user or attribute data would normally be stored. Attribute data 67 of the block 59 is stored in another block 69, and requires only 4 bytes. Indeed, the block 69 includes a number of such block attribute records for other blocks that contain user data. This data architecture is further described in aforementioned application Ser. No. 09/505,555, now Pat. No. 6,426,893.

Figure 5:
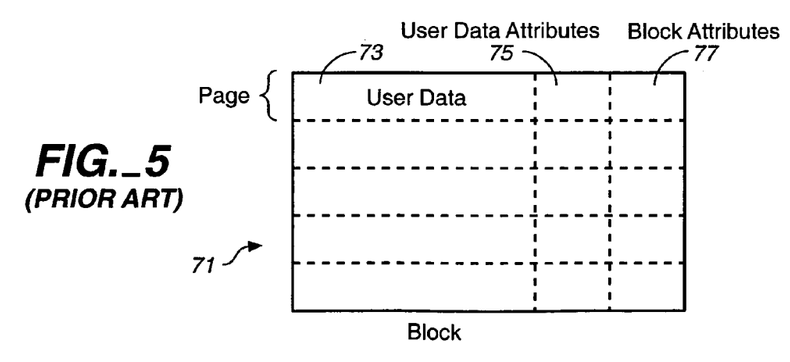
FIG. 5 illustrates a further existing way of storing the data of FIG. 2.

FIG. 5 illustrates one block 71 a memory system according to yet a different architecture that has been commercially used by others for some time. The block 71 here is much larger than that of the systems of FIGS. 3 and 4, typically having a data storage capacity of 16 or 32 kilobytes. The block 71 is divided into a multiple pages, such as 16, 32, or 64 pages. One page includes 512 bytes of user data 73 and 16 bytes total of user data attributes 75 and block attributes 77, in this specific example. No spare cells are provided. A page is a unit of programming and reading, while the larger block remains the unit for erase. An entirely programmed block is erased before data can be written to any one page within the block.

In each of the systems of FIGS. 3–5, the units of data stored are constrained to match the size of the blocks or pages of physical memory that are provided. Heretofore, a change in the data sector structure was thought to require a change in the physical memory structure to accept it. Such a change is quite expensive, takes a great deal of time, and necessarily discourages making changes to the data sector structure that may otherwise be desirable.

Figure 6A:
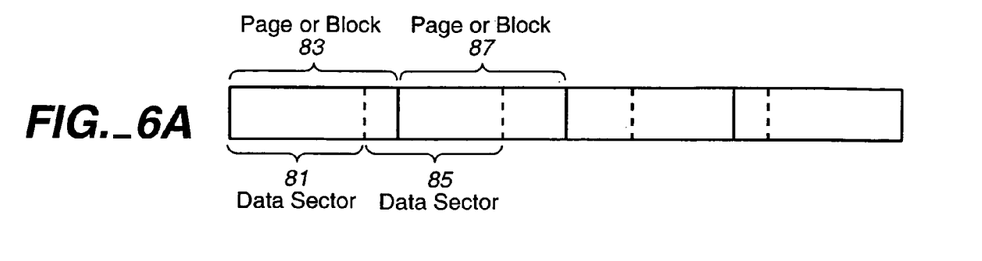
FIGS. 6A and 6B illustrate alternate ways of storing the data of FIG. 2, according to the present invention.

Therefore, according to one aspect of the present invention, a data sector structure is adapted to a different physical memory block and page structure without having to change the physical structure, as is very generally illustrated in FIG. 6. FIG. 6A shows the case where a sector or other unit of data being stored is smaller than the capacity of the individual memory cell blocks. A data sector 81, for example, fits totally within a page or block 83, while another data sector 85 is stored partially in the page or block 83 and partially in the page or block 87. Since data is written into and read from each of the pages or blocks in separate operations, the data sector 85 is written in two such operations. The portion of the data sector 85 that is written into the page or block 83 is preferably combined with the data sector 81 in a controller memory prior to such writing, in order to program the page or block 83 in a single operation. Data is preferably similarly combined from two adjacent data sectors prior to programming each of the pages or blocks.

Figure 6B:
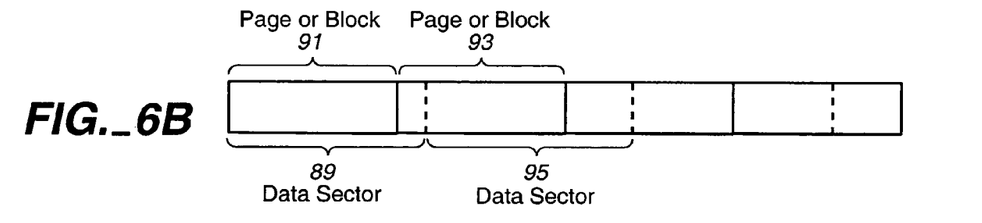

FIG. 6B illustrates an alternative situation, where the data sector is larger in size than can be stored in an individual page or block. A data sector 89 is stored in both of the pages or blocks 91 and 93. Another data sector 95 is stored in a remaining portion of the page or block 93 and in another page or block. Programming of pages or blocks that contain portions of two data sectors, such as 93, is preferably performed after the data from each of the two data sectors being partially stored therein, such as the data sectors 89 and 95, are assembled in a controller memory. Conversely, during reading of data sectors, the data in each of the two pages or blocks containing data from the desired sector are read and the data assembled in a controller memory into the units of the two data sectors. These two data sectors are then transferred to the host system by the controller.

The data sectors illustrated in FIG. 6 may include (1) only user data, (2) a combination of user data and user data attributes, without block attributes, or (3) a combination of all of user data, user data attributes and block attributes. Any remaining attribute data may be stored in different blocks with a link provided between the two. The user data of a sector need not all be stored in a single physical page or block of the memory array.

A First System Embodiment

Figure 7:
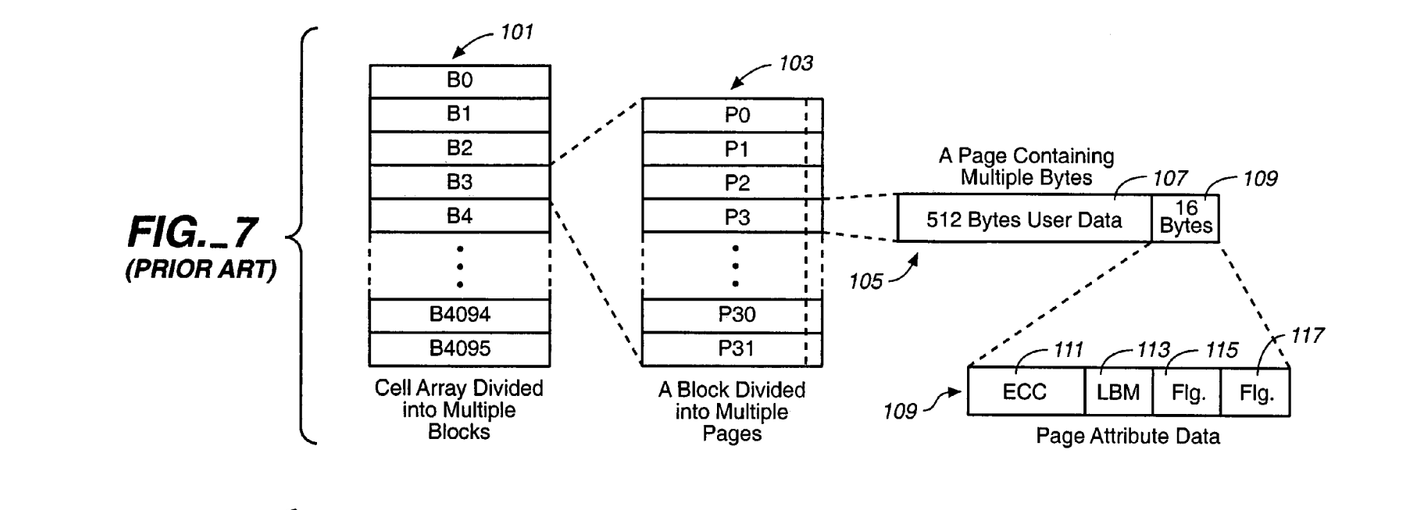
FIG. 7 shows, in more detail, the architecture and use of a specific existing commercial memory system.

FIG. 7 illustrates the array and data architectures of one specific existing commercial memory system, and FIGS. 8–11 show modifications made to this system in accordance with the present invention. The existing memory array 101 (FIG. 7) is divided into a large number of blocks B, 4096 of them in this case. Each of these blocks, such as a block 103, is divided into a number of pages P, in this case 32 pages per block. Each page, such as the page 105, is configured to store 512 bytes of user data 107 and 16 bytes of attribute (overhead) data 109. The page attribute data 109 includes an ECC 111 calculated from at least the user data 107, a logical block number (LBN) 113 in which the page is located, and two flags 115 and 117. The ECC 111 is normally an attribute of the user data. A separate ECC (not shown) may be calculated from the remaining page attribute data and stored within the page attribute data 109 but some fields, such as the fields 113, 115 and 117, are often stored without a full ECC. The LBN 113 is an attribute of the block in which the page is located, and, as can be noted, is repeated in each of the 32 pages within a block.

Figure 8:
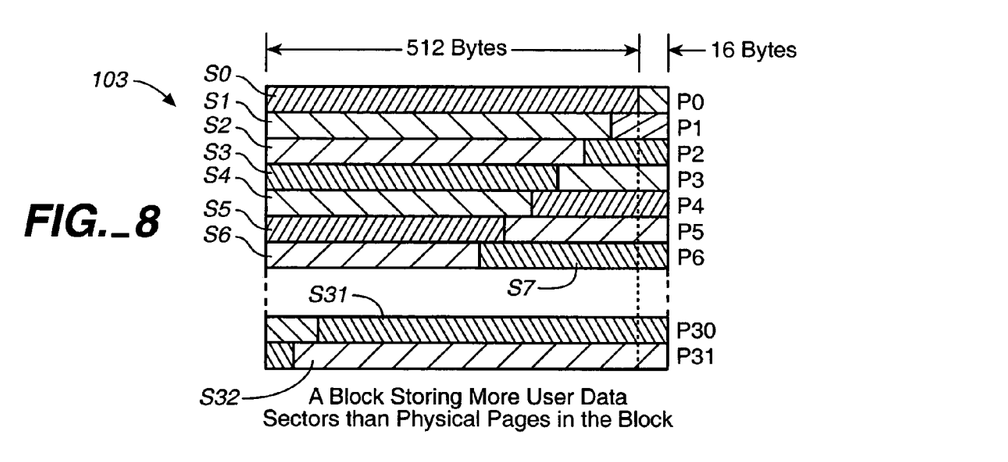
FIG. 8 shows an example of packing sectors of user data into a block of the memory across its pages.

FIG. 8 illustrates a modified use of the block 103 to store an additional sector of user data but without the overhead data now included in each page. Thirty-three sectors S of user data (S0–S32) are stored in the thirty-two pages (P0–P31) of the block 103 of memory. Each user data sector contains 512 bytes of data. The first sector S0 fills all but the memory cells of the first page P0 that normally store the 16 bytes of overhead data. That 16 bytes of capacity is used to store the first 16 bytes of the next user data sector S1, the remaining of the data sector S1 being stored in the second page P1. That then leaves 32 bytes of capacity in the second page P1 that is used to store the beginning of the third data sector S2, the remaining portion of S2 being stored in the third page P2, and so on. It works out, because of the physical and data sector numbers, that each block can be fully filled with 33 sectors of user data. However, if such an even allocation does not exist in another system with different physical page, block and data sector sizes, that remaining capacity can be used for a portion of another data sector, with the remaining portion of the data sector being stored in another page in a different block.

Since a page of the block 103 is the smallest unit of memory that may be written in one programming operation, user data from the various sectors S0–S32 is preferably assembled in a memory of the controller into the pages shown in FIG. 8. That is, before the first page P0 is written to the block 103, the first 16 bytes of the second user data sector S1 is attached to the end of the sector S0, and the page is then programmed. Similarly, for the second page P1, the remaining data of the sector S1 is combined with the first 32 bytes of data from the sector S2 in a non-volatile memory of the controller, and the combination then written from that memory into the second page P1 of the non-volatile memory.

Figure 9:
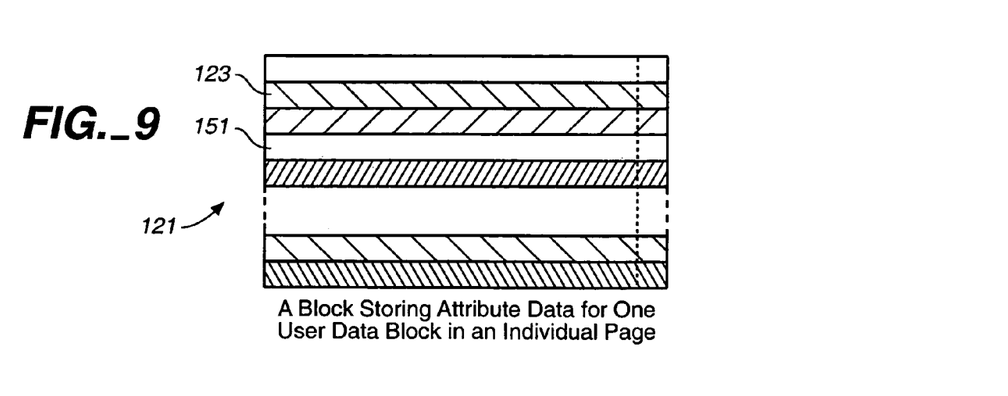
FIG. 9 shows an example of the storage of pages of overhead data in a block different from that of corresponding user data of FIG. 8.
Figure 10:
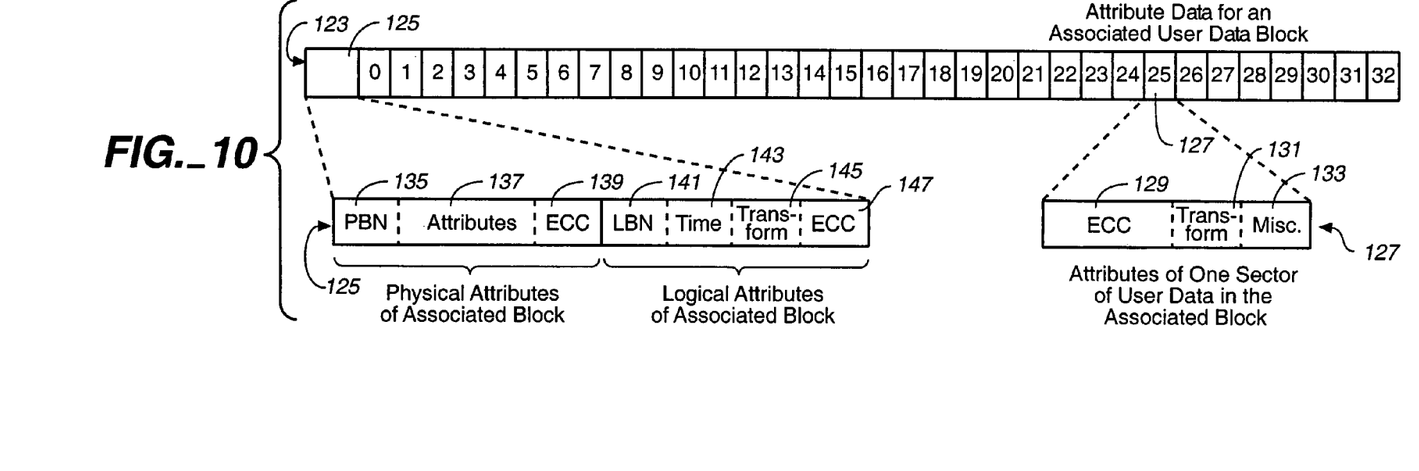
FIG. 10 illustrates and example page of overhead data of FIG. 9.

A different data structure of another block 121 is illustrated in FIG. 9. Each page of that block, such as a page 123, stores a number of records of attribute (overhead) data that accompany the sectors of user data stored in other blocks such as the block 103 of FIG. 8. In one embodiment, the page 123 stores all, or nearly all, of the storage block attribute data for the block 103 and the user data attributes for each of the 33 user data sectors stored in that block. A specific example of the data structure for the page 123, and every other page written to the block 121, is shown in FIG. 10. Since there are 32 pages in the block 121, there will be at least one attribute data block of the type of block 121 for every 32 user data blocks of the type of block 103.

The attribute page shown in FIG. 10 includes a field 125 that stores the attributes of the block of the form shown in FIG. 8 in which the corresponding user data is stored. A separate field is provided for each of the data sectors stored in the block 103 of FIG. 8, a field 127 (FIG. 10) storing the attributes of the user data sector S25 of the block 103 (FIG. 8). Each of the user data sector attribute records includes an ECC 129 calculated from the corresponding sector of user data. The rotation of that user data can be stored at 131, and other attributes of the user data of the corresponding sector potentially being stored at 133.

The attributes 125 (FIG. 10) of the block 103 (FIG. 8) are shown divided into physical and logical attributes, for purposes of discussion. The physical attributes, in this example, include a physical address (PBN) 135 of the user data block 103, and one or more other attributes 137 that can include an experience count of the number of times that the block has been erased, a programming voltage, an erase voltage, and the like. An ECC 139 may be provided for the fields 135 and 137. The logical attributes of the block 103 can include its logical address (LBN) 141 of the user data block 103, a time 143 at which the attribute page 123 was last written to the block 121, a transform flag 145 of the user data or the data within the page 123, and an ECC 147 of the fields 141, 143 and 145. The fields 131 and 133 can be provided without an ECC.

If the transform flag field 131 is not included in the user data attributes, the transform field 145 of the block attributes will specify the transform of the data in all of the user data sectors of the corresponding block 103 and of the attribute data page 123. If the transform field 131 is included, the transform field 145 only specifies the transform of the data in its page 123.

The time field 143 records some indication of when the corresponding user data block 103 has last been updated. If the memory system includes a real time clock, the time at which an update occurs is stored. But since most systems do not have such a clock, the field 143 may record a value indicative of when data of a corresponding user data block is updated. In a specific implementation, a separate count is maintained in the field 143 for each LBN, with a count being read and incremented each time the user data of its corresponding logical block is rewritten. The content of the field 143 is then used by the system controller to determine which of two blocks containing the same data or identified by the same LBN is the most recent.

An advantage of storing the attributes separate from the block and user data sectors is that the attribute data for an entire block of user data need be written only once. Further, the attributes of the corresponding user data block are stored only once as part of the attribute data page for that block, rather than being duplicated as part of each page of user data, as is currently being done. During programming, the page 123 (FIG. 10) is formed in a memory of the controller as user data is written to its corresponding block 103. The page 123 is then written into the block 121 after all the user data of a file being stored has been written to the block 103. If the size of a file requires writing user data to more than one user data block, a distinct attribute record page is formed in the controller memory for each such block, and all the attribute record pages are then written to the non-volatile memory after all the user data of the file has been programmed.

When there is a change to the attribute data page 123 that needs to be recorded, for example, that page is read by the controller into one of its memories, changes are made to its data and the page then written back to an unused page of the block 121, such as a page 151. The time field 143 (FIG. 10) of the attribute data is updated, so that the processor can distinguish between the current and old versions of that data. Only the current version is used. If there is no unwritten page in the block 121, the updated attribute data is written to some other block of attribute pages that has a spare. When a sufficient number of old attribute records exist in the block 121 and others like it, the current records are read into a memory of the controller, the block may be erased and the current records written back into the block. Since the memory of the controller will usually be a volatile type, in order to avoid loss of data resulting from a loss of power, the current records of a block may alternatively be copied to a different previously erased non-volatile memory block prior to erasure of the original block. In either case, the result is the creation of spare, unwritten pages in either the original or a different block for use in the future to store updated or new attribute pages.

The very specific example being described with respect to FIGS. 8–11 can be modified in many ways, while still implementing the present invention. For instance, an attribute data page can include records of more than one user data block if the size of each of the records is reduced, or if a different array architecture stores fewer sectors of user data, either because the blocks are smaller or the sectors are larger, or if the size of the pages is smaller, etc. Conversely, a still different architecture or larger attribute record size can require more than one page of attribute data per block of user data. The present invention is applicable to non-volatile memory systems within a wide range of physical and data architectures.

When a request is received from a host to read sectors of user data from the non-volatile memory, a beginning logical block address (LBN) and a number of blocks containing data to be read are determined by the controller. The attribute data pages, such as those described with respect to FIGS. 9 and 10, are then scanned by the controller to identify the page or pages (FIG. 10) whose LBN fields 141 are within the range of LBNs specified by the controller for reading. A table is then built in the form of FIG. 11 and stored in volatile controller memory. One column 153 lists the PBNs in the attribute fields 135 whose LBNs 141 are within that range, the LBNs then becoming addresses to the table, as illustrated by a column 155. The physical address (PBN) and page number for each attribute page from which a user data PBN is present in column 153 is included in a line of the table of FIG. 11 that contains that user data PBN, thus forming columns 157 and 159.

Figure 11:
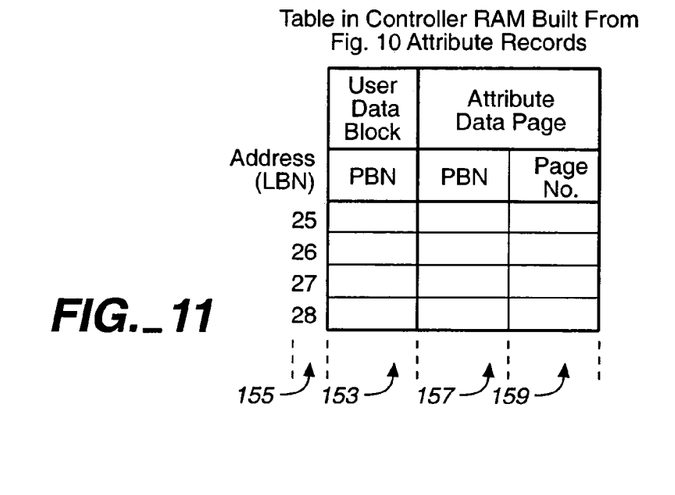
FIG. 11 illustrates a table that is built by the memory system controller from data within the overhead data stored in accordance with FIGS. 8 and 9.

This table is then accessed during a read operation by the user data LBN to determine the physical block location (PBN) where the requested user data reside, and the physical address of the corresponding attribute data page. The attribute data pages for the entire read operation are then read into a memory of the controller, if the controller memory has sufficient capacity, or, alternatively, read into the controller memory one or a few pages at a time as needed to execute the read operation. As the user data are then read from the non-volatile memory, the ECCs of the user data attribute data records (such as record 127 of FIG. 10) are read by the controller and processed with the read user data, in order to identify and correct any errors before sending the read user data to the host.

The forgoing example provides for storing only user data in one block and all related attribute data in another. However, there may be instances where it is preferable to include a user data attribute as part of the individual user data sectors, or as a separate record within a block that otherwise stores only user data sectors. One such attribute is the transform flag of the user data, so that the controller need not access the separate attribute data page before being able to read those sectors. If the transform flag is included with the user data, the controller then knows how to apply the inverse transform to read that data without having to separately access the corresponding attribute page. Such inclusion is preferably limited to specific applications where doing so improves the performance of the memory system in terms of reading time.

A Second System Embodiment

Figure 12:
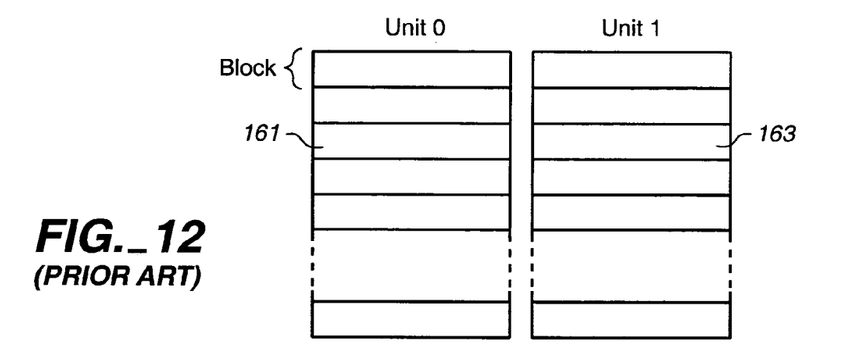
FIG. 12 shows a portion of the architecture of another specific existing commercial memory system.
Figure 13:
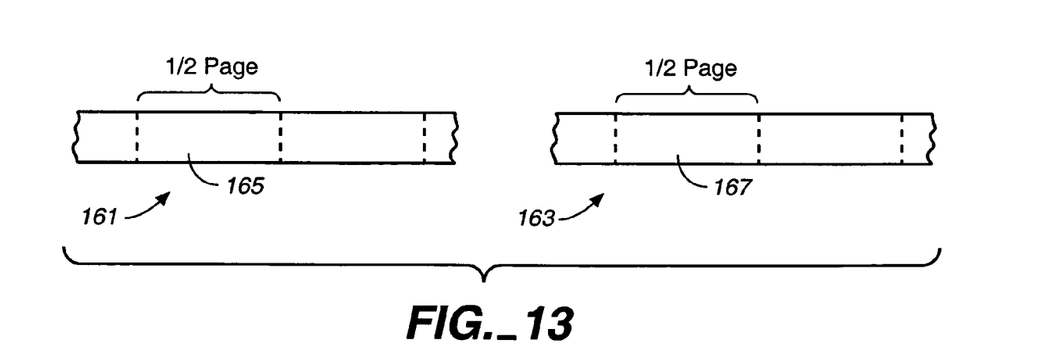
FIG. 13 illustrates an example of packing sectors of user data into blocks of the memory system of FIG. 12.

Application of the invention to another type of non-volatile memory system with a much different architecture is briefly described with respect to FIGS. 12 and 13. The memory array is divided into an even number of units, such as eight, two such units 0 and 1 being illustrated in FIG. 12. A pair of adjacent units, termed a plane, may share peripheral circuits, such as word line decoders. Each unit contains a large number of blocks of memory, such as a block 161 in the unit 0 and a block 163 in the unit 1. The individual blocks are in turn divided into multiple pages of memory.

Rather than forming a full page from memory cells of a single block, which is usually done, the example shown puts one-half 165 of a given page in the block 161 of the unit 0 and the other one-half 167 of the same page in a block of the unit 1. The two blocks may have the same relative address within the units, and may be formed of a single row of memory cells that has a common word line extending through the two blocks. It may be preferable, however, for the corresponding one-half pages to be in blocks that do not share a word line. In either event, this page segmentation allows the simultaneous programming of an increased number of a page's cells in parallel.

The memory pages of this different architecture may be used in the same manner as described above with respect to the first example. Sectors of user data smaller or larger than the capacity of the pages are stored across adjacent pages within the individual blocks, except that one-half of each user data sector is stored in one-half of the page in one unit's block and the other one-half of the sector is stored in the remaining one-half of the page in the other unit's block. Similarly, for those blocks containing pages devoted to the storage of attribute records of the user data and the blocks in which such data are stored, one-half of a page of attribute data is stored in one block and the other one-half in its partner block. The operation of such a memory system is similar to that described above for the first system embodiment, except that individual pages are read from half-page portions in two blocks.

It should be noted that the memory systems of any of the forgoing applications may be implemented by storing one bit of data per memory cell storage element or, alternatively, by storing two or more bits per storage element. One bit is stored when the memory cell is operated in two states with only two threshold voltage levels (binary), and more than one bit is stored when operated in more than two states by operating the cells with more than two threshold voltage levels (multi-state). Many of the patents and applications identified above as being incorporated herein describe further aspects of binary and multi-state operation. Each of the two or more bits stored in an individual cell can either be addressed in a common page or in different pages within a memory system organized in the manner described above.

Although the various aspects of the present invention have been described with respect to specific implementation examples, it will be understood that the invention is entitled to protection within the full scope of the appended claims.

It is claimed:

1. In a semiconductor memory having an array of non-volatile memory cells divided into a plurality of blocks that individually include a minimum number of memory cells that are erasable together, the blocks of memory cells being further divided into a plurality of pages that individually have a capacity to store at least one unit of user data plus a plurality of bytes of overhead data, a method of operating the memory, comprising:

programming a plurality of units of user data into the pages of at least one of the blocks of memory cells in successive adjacent physical locations therein including the capacity provided in the pages for storing the plurality of bytes of overhead data and across boundaries of the pages, continuing to program the units of user data into the pages of said one block until a number of units of user data have been programmed into said one block that exceed a number units that the plurality of pages that said one block would store if user data were not being stored in the capacity of the pages provided in said one block for storing the plurality of bytes of overhead data, thereby to store an increased number of units of user data in the block, and storing, in another one of the plurality of blocks different from said one block, a plurality of bytes of overhead data associated with the units of user data stored in said one block.

2. The method of claim 1, wherein no bytes of overhead data are stored in said one block in which the plurality of units of user data are programmed.

3. The method of claim 1, wherein all the plurality of bytes of overhead data associated with units of user data programmed into said one block are stored together in a common another one of the blocks.

4. The method of claim 1, wherein the bytes of overhead data stored in said another one of the blocks of memory cells include data of attributes of the user data stored in said one block and data of attributes of said one block.

5. The method of any one of claims 1–4, additionally comprising operating the memory cells with a plurality of effective threshold levels in excess of two that correspond to a plurality of alterable states of the individual cells in excess of two, whereby charge storage elements of the cells individually store more than one bit of data.

* * * * *